Sept. 18, 1956           R. H. GILL           2,763,314
EXPANSIBLE HOLLOW THREADED RIVET HAVING A BUTTRESS PORTION
TO PROVIDE FOR INCREASED RESISTANCE TO SHEAR
Filed Nov. 29, 1952
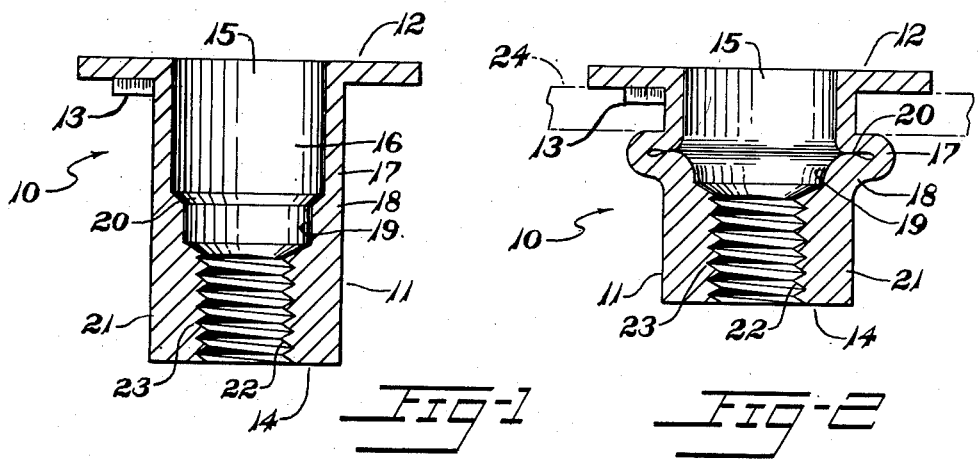
Inventor
Ray H. Gill
By Dwight L. Moody
Atty.

United States Patent Office 2,763,314
Patented Sept. 18, 1956

2,763,314

EXPANSIBLE HOLLOW THREADED RIVET HAVING A BUTTRESS PORTION TO PROVIDE FOR INCREASED RESISTANCE TO SHEAR

Ray H. Gill, Akron, Ohio, assignor to The B. F. Goodrich Company, New York, N. Y., a corporation of New York Application November 29, 1952, Serial No. 323,254

2 Claims. (Cl. 151—41.72)

The invention relates to rivets and especially to expansible hollow rivets highly resistant to shear of the expansible wall portions thereof during the upsetting i. e. expanding and shortening of the rivet shanks.

Heretofore, expansible hollow rivets of the counterbored, internally threaded, tubular shank type adapted for attachment to work by operation from one side only of the work, have normally been made with the major diameter of the internal threads slightly less than the diameter of the counterbore to provide an outwardly expansible, thin-walled, tubular portion extending axially from the head of the rivet to an internally threaded, slightly thicker-walled, hollow end portion. This rivet design and construction has been accepted as standard for commercial usage, and is described and claimed in Patent No. 2,149,199 to Harry E. Waner for Tubular Rivet.

For good attachment purposes, a particular diameter of aperture through the work is normally required for each particular size of the standard Waner type hollow rivets, which aperture diameter has a specified plus tolerance of only several thousandths of an inch, that is, it must not exceed the outside diameter of the rivet shank by more than several thousandths of an inch. Also, a good attachment requires a specified travel of the draw rod of the upsetting tool so as to apply sufficient axial force to the rivet to expand and shorten the expansible tubular portion thereof to an axially compact, outwardly bulged, annular form of relatively flattened, substantially closed looped shape in axial cross-section with the upper part of the bulged wall uniformly and firmly seated against the back of the work and with the tubular portion within the aperture seated firmly against the adjacent wall of the work and with the lower end of the tubular portion bent in a sharp radius merging with the threaded end portion, thereby producing a tight fit of the upset rivet in the work.

Generally a good attachment is not effected when the standard Waner type hollow rivet is attached to work having an aperture of greater diameter than that normally specified for the rivet. In such use of the rivet there is initially excessive clearance between the tubular portion and the wall of the work at its larger diameter aperture so that, upon normal travel of the draw rod and application of axial upsetting force to the rivet, the tubular portion within the aperture flares radially outward and downwardly into contact with only the back edge of the work at the aperture where the flared part merges with the outwardly bulged wall of the rivet, which wall generally has an open looped shape in axial cross-section and hence a loose fit against the work. Additional application of axial upsetting force to close the loop and axially compact the bulged wall into a tight fit against the work generally produces shearing of the bulged wall at its juncture with the threaded end portion of the rivet due to a camming action at the region of merger of the flared and bulged parts of the tubular portion.

The inner surface of the tubular portion at this region of merger of its flared and bulged parts is inwardly inclined and upwardly curved and functions as a cam surface upon which the outwardly, sharply bent lower part of the tubular portion at its juncture with the threaded end portion can slide inwardly and upwardly substantially unrestrained under the influence of the additional axial force, until shear takes place at such lower part of the tubular portion i. e. inner end of the counterbore, and before a tight fit of the bulged wall is effected against the back of the work.

The standard hollow rivets having a slightly thickened wall at the threaded end portion as compared to that of the expansible tubular portion present at such end portion an end surface of the shank of relatively limited area which is thereby deficient in bearing area and good holding power for purposes of attaching a body to the rivet at such end surface. Also, each size of standard hollow rivet is designed to accommodate a particular size of attaching screw fastener and of threaded draw rod; hence the shank has a length which permits a sufficient number of threads in the bore to have a thread-stripping strength greater than the normal axial upsetting force but less than the tensile strength of the draw rod, and which provides sufficient wall strength of the threaded end portion to resist expanding the wall of the threaded end portion away from the draw rod during the application of the axial upsetting force.

A mere increase in the standard wall thickness of the threaded end portion by virtue of increase in the outside diameter of the standard hollow rivet and by virtue of increase in the diameter of the counterbore so as to maintain the normal axial upset force within the strength of the draw rod, does provide increased bearing area of the end surface of the shank and increased resistance to expansion of the threaded end portion, but does not eliminate shear of the expansible tubular portion at the inner end of the counterbore nor the camming action of the bulged wall.

However, the increased wall thickness and hence stiffness of the threaded end portion functions to stiffen the lower end part of the tubular portion so that it resists outward bending and, when greater than normal axial upsetting force is applied inadvertently to the rivet, shear of the tubular portion takes place at its lower region of increased resistance to bending largely because of the camming functioning of the internal curved surface of the radially inner upper part of the bulged wall of the tubular portion.

Also, the internally threaded hollow rivets in their upset condition in the work have at times tended to permit loosening of a screw fastener in the rivet under vibratory and other movement of the work, and auxiliary lock washers and other like expedients have been only partially effective to eliminate loosening of the screw fastener.

An object of the invention is to overcome the foregoing and other difficulties and disadvantages of the prior rivets.

Other objects of the invention are to provide an improved expansible rivet suitable especially for attachment to work by operation from one side only of the work; to provide for increased resistance to shear of the wall of the rivet during the expansion or upsetting of the rivet in the work; to provide for restraining additional bulging of an expansible tubular portion of the rivet when such tubular portion is radially and outwardly bulged to a determinate extent; to provide for preventing shear of the bulged wall of the rivet during the upsetting operation; to provide for resisting radially inward bulging of the expansible tubular portion during the upsetting operation; and to provide for detachably locking an attaching screw fastener in the upset rivet.

Further objects of the invention are to provide an improved expansible hollow rivet of relatively larger-than-standard outside diameter capable of accommodating a relatively small diameter standard threaded fastener therein; to provide for a relatively large bearing area of the end surface of the rivet shank remote from the head end portion of the rivet; to provide for relatively shorter-than-standard projection of the rivet shank beyond the back of the work; and to provide the improved rivet with a thicker-than-standard internally threaded wall portion; and to provide for simplicity of construction, convenience of manufacture and for effectiveness of operation.

These and other objects and advantages of the invention will be apparent from the following description.

In the accompanying drawings which constitute a part of this specification and in which like numerals are employed to designate like parts throughout the same, Fig. 1 is a longitudinal sectional view of an expansible tubular rivet constructed in accordance with and embodying the invention, Fig. 2 is a view like Fig. 1 but showing the rivet in its expanded condition in apertured work indicated by broken lines.

In the illustrative form of the invention shown in Figs. 1 and 2, the construction of an expansible hollow or tubular rivet 10 having provision for resisting shear stresses comprises a tubular body including shank 11 of ductile material such, for example, as aluminum alloy, brass, stainless steel, steel or other suitable metal, or a ductile plastic material of the thermoplastic type. The tubular body including shank 11 has a head end formed into a suitable head during the upsetting of the rivet, or may be pre-formed into end portion 12 which may be a flat head, as shown, or other suitable shape of head for engaging or seating against the front of apertured work 24. If desired, a key 13 may be provided at the under face of the head 12 to resist rotation of the rivet in the work 24.

The tubular body 11 may have a continuous annular wall of circular shape in transverse cross-section and of substantially uniform outside diameter from the head end portion 12 to the other end 14 of the rivet. It has an axial bore 15 of stepped construction with a counterbore 16 of substantially uniform maximum diameter extending longitudinally or axially inward from the head end portion 12 to a position spaced substantially from such head end portion to provide at the counterbore a thin smooth-walled tubular or cylindrical portion 17 of determinate length adjacent or nearest the head end portion 12, which length is established in accordance with the thickness of the work. The thin wall of the tubular portion 17 is adapted to be outwardly expanded and axially shortened, or collapsed to a continuous, annular, outwardly bulged form of determinate radial extent having a relatively flattened substantially closed looped shape in axial cross-section as shown especially in Fig. 2, so as to engage and seat uniformly and fit tightly against the back of the work 24, and thus clamp the work securely between the head 12 and the continuous annular bulged wall of the tubular-portion 17.

The invention provides at the inner end of the counterbore 16, that is the end of the tubular portion 17 remote from the head 12, a thickened buttress portion 18 in continuation of the expansible tubular portion 17. The buttress portion, by virtue of its relatively thicker wall as compared to that of the tubular portion 17, provides a continuous annular or cylindrical wall portion forming an abutment or internal rib 19 projecting radially inward relative to the tubular portion 17, and provides a wall portion presenting a continuous annular inner seating surface 20 facing toward the head end portion 12 and extending between the cylindrical wall portions, as shown in Fig. 1. The seating surface 20 may be smooth and is of frusto-conical form so as to extend radially inward and inclined away from the tubular portion 17, as shown in Fig. 1.

The construction advantageously facilitates limited radially outward flexure or bending of the thickened wall of the buttress portion 18 into engagement with the tubular portion 17, during the upsetting of the rivet, such that the seating surface 20 jams against the inner face of the wall of the tubular portion in its outwardly bulged form of determinate extent and at its sharply curved, radially inner and upper region adjacent the head 12 and at the back of the work as shown in Fig. 2 and jams at a position in axial alignment with the wall of the tubular portion within the aperture in the work. Thus, the buttress portion coacting with the tubular portion within the aperture effectively resists a camming action by said inner face and restrains additional bulging of the tubular portion 17, and also effectively resists shear stress in the axially opposite, sharply curved, radially inner and lower region of the bulged wall of the tubular portion at its end remote from the head end portion i. e. at its junction with the buttress portion 18 under force applied axially of the rivet toward the head end portion 12 to expand and shorten the thin wall of the tubular portion into tight fit against the back of the work.

Also, the thickened buttress portion 18 functions to transmit the axially applied force to the expansible tubular portion 17 such that the latter portion 17 initially and slightly expands to fit snugly in the aperture in the work 24, and subsequently and substantially expands to its annular outwardly bulged form of determinate extent against the back of the work, while at the same time the buttress portion 18 flexes and bends to a limited degree radially outward and moves axially toward the head end portion 12 a sufficient amount to change the position and inclination of and jam the seating surface 20 against the bulged wall of the tubular portion at its sharply curved radially inner region adjacent the back of the work 24 and at a position substantially in axial alignment with the tubular portion within the aperture of the work, as shown in Fig. 2. It will be noted that the buttress portion 18 mutually coacts with the tubular portion 17 to produce the desired outward bulge of determinate extent, but restrains additional bulging and resists shear of the bulged wall of the tubular portion under additional axially applied upsetting force.

The tubular body including shank 11 of the rivet has preferably a relatively thick-walled, force-transmitting, hollow portion 21 of suitable length in continuation of the buttress portion 18. It is desirably internally threaded for transmitting axially applied force to the buttress portion 18 and to the tubular portion 17. The internally threaded hollow portion 21 may extend to the other end 14 of the rivet, as shown in Figs. 1 and 2, although not necessarily limited thereto; since the hollow portion may terminate short of the end 14 as for closed end purposes.

The annular wall of the hollow portion 21 is of greater stiffness and radial thickness than that of the tubular portion 17 and of the buttress portion 18, and has a thickness such that sufficient stiffness of the wall is provided to prevent effectively outward bulging of the hollow portion. The internal threads 22 in the bore of the hollow portion have their major diameter, indicated by the numeral 23, substantially less than the diameter of the counterbore 16 at the tubular portion to facilitate the provision of the desired thickness and stiffness of the annular wall of the hollow portion 21 for resisting lateral distortion thereof and for transmitting the axial upsetting force to the tubular portion 17 to compel outward expansion of such portion to a determinate extent in accordance with the thickness of the work 24.

When the hollow portion 21 extends to the end 14 of the rivet as shown in Fig. 1, the annular end surface at 14 has substantially increased bearing area as compared to that of the standard Waner type hollow rivet, by virtue of the increased wall thickness, so that such end surface has good holding power for facilitating the secure attachment of a body to the rivet at its end 14 rather than at its head end. This is advantageous for some applications of the improved rivet.

The increased stiffness and thickness of the wall of the hollow portion 21 makes feasible a lesser number of internal threads as compared to the standard Waner type hollow rivet without sacrificing thread strength sufficient to withstand the axial upsetting force; hence the hollow portion 21 can be made relatively shorter than standard resulting in less projecting length of the rivet shank at the back of the work. This also is advantageous for some applications of the improved rivet.

For the rivet shown in Fig. 1 the axial extent or length of the expansible tubular portion 17 for each size or outside diameter of the rivet is normally required to be increased an amount proportionate to each substantial increase in thickness of the work 24 to which the rivet is to be attached, so as to provide sufficient length of the expansible tubular portion 17 to expand into snug fitting relation against the wall at the aperture in the work, and also to expand and shorten to an outwardly bulged form of determinate extent and relatively flattened substantially closed looped shape in section substantially uniformly against the back of the work 24 to effect a good attachment of the rivet to the work. However, an important feature of the invention is that the radial thickness and the axial length of the buttress portion 18, once such dimensions have been established to provide good results for each size or outside diameter of the rivet, need not be increased but remain substantially constant regardless of the length of the tubular portion 17. This is advantageous from the standpoint of convenience of manufacturing and reduced cost, while facilitating the desired jamming and reinforcing functions of the buttress portion which prevent shearing of the bulged wall of the tubular portion.

Variations may be made without departing from the scope of the invention as it is defined in the following claims:

I claim:

1. An intergal one-piece expansible hollow rivet for attachment to apertured work by operation from one side only of the work, said rivet comprising a tubular body of ductile material and uniform outside diameter, a head extending radially outwardly of said body at one end thereof, a thin cylindrical wall portion of the body extending axially away from said head to an intermediate portion of the body, said cylindrical wall portion having a substantially uniform wall thickness and being outwardly expansible when axially contracted for forming an annular bulge against the other side of the work, said intermediate portion including a cylindrical wall portion of substantially uniform but greater thickness than the first said thin cylindrical wall portion outwardly bendable yet resistant to shear stress and a wall portion having a frusto-conical inner surface extending between the said cylindrical wall portions, and an end portion of said body opposite said head comprising an internally screw threaded portion extending axially away from said intermediate portion, the wall thickness of said threaded portion being greater than that of said intermediate portion.

2. An integral one-piece expansible hollow rivet for attachment to apertured work by operation from one side only of the work, said rivet comprising a tubular body of ductile material including a continuous annular wall of uniform outside diameter, a head end portion, a counterbore of uniform diameter extending axially through the head end portion and into said body providing a thin wall portion outwardly expansible to form an annular bulge when axially contracted, a threaded bore of lesser root diameter than said counterbore extending into said body at the other end thereof, and an intermediate bore having a substantially uniform diameter less than that of said counterbore but greater than that of said threaded bore to provide a buttress wall portion outwardly bendable yet resistant to shear stress and said intermediate bore extending between said bores with a portion thereof contiguous to said counterbore having the internal wall surface of such portion inclined to the longitudinal axis of the rivet and facing toward said head end portion to provide an internal annular surface in said buttress wall portion adapted to non-slidingly seat upon a part of the internal surface of the outwardly expansible wall portion when the latter is axially contracted and outwardly bulged and when said buttress wall portion is outwardly bent.

References Cited in the file of this patent

UNITED STATES PATENTS

| | | |
|---|---|---|
| 2,149,199 | Waner | Feb. 28, 1939 |
| 2,324,142 | Eklund | July 13, 1943 |
| 2,336,791 | La Barre | Dec. 14, 1943 |
| 2,384,347 | Schutz | Sept. 4, 1945 |
| 2,477,056 | Gookin | July 26, 1949 |
| 2,553,236 | Bratfisch | May 15, 1951 |
| 2,562,019 | Colley | July 24, 1951 |

FOREIGN PATENTS

| | | |
|---|---|---|
| 536,553 | Great Britain | May 19, 1941 |
| 878,521 | France | Oct. 12, 1942 |